(No Model.) 2 Sheets—Sheet 1.
J. H. SWIHART.
COMPUTING SCALE.
No. 490,518. Patented Jan. 24, 1893.
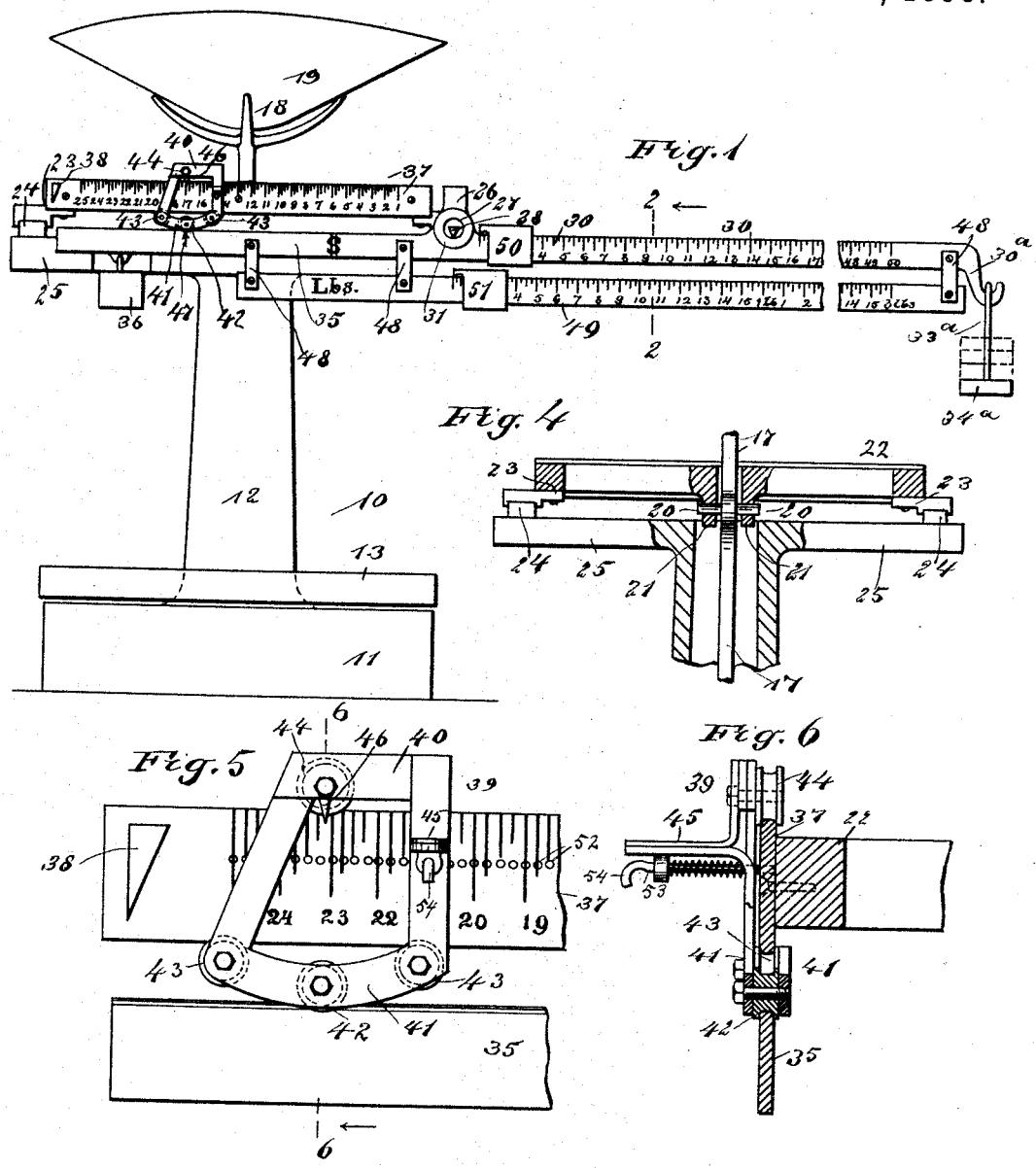
WITNESSES:
J. A. Bergstrom
C. Sedgwick
INVENTOR
J. H. Swihart
BY Munn & Co
ATTORNEYS.

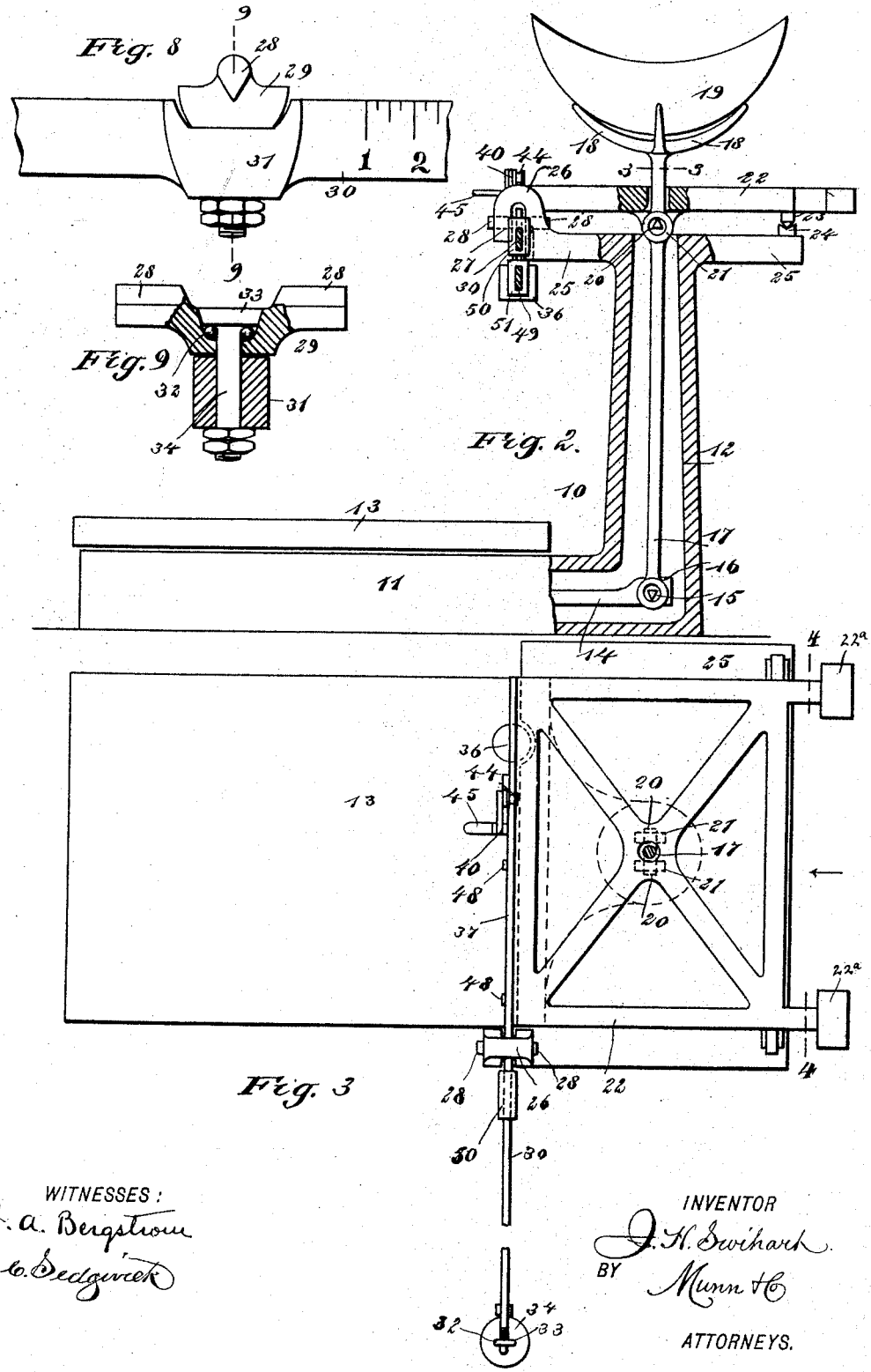

UNITED STATES PATENT OFFICE.

JOHN HENRY SWIHART, OF DAYTON, OHIO.

COMPUTING-SCALE.

SPECIFICATION forming part of Letters Patent No. 490,518, dated January 24, 1893.

Application filed April 11, 1892. Serial No. 428,646. (No model.)

*To all whom it may concern:*

Be it known that I, JOHN HENRY SWIHART, of Dayton, in the county of Montgomery and State of Ohio, have invented a new and Improved Computing-Scale, of which the following is a full, clear, and exact description.

My invention relates to improvements in weighing scales, and the object of my invention is to produce a simple and convenient scale, which may be used in the ordinary way for ascertaining the weight of articles, and which may also be used for automatically computing the price to which certain weighed articles amount and the amount of an article which may be given for a certain price.

My invention consists in certain features of construction, and combinations of parts, as will be hereinafter described and claimed.

Reference is to be had to the accompanying drawings forming a part of this specification, in which similar figures of reference indicate corresponding parts in all the views.

Figure 1 is a broken front elevation of the scale embodying my invention; Fig. 2 is a cross section on the line 2—2 in Fig. 1, and with parts of the scale standard and platform lever shown in section; Fig. 3 is a sectional plan on the line 3—3 in Fig. 2; Fig. 4 is a sectional rear view on the line 4—4 in Fig. 3, and showing in detail the connections between the upright scale rod and the platform lever; Fig. 5 is a broken detail front elevation of the sliding bearing and its connections with the price scale beam and the price per pound beam; Fig. 6 is a cross section on the line 6—6 in Fig. 5; Fig. 7 is a detail of the joint between the upright scale rod and platform rod; Fig. 8 is an enlarged detail front elevation of the joint between the price beam and its support; and Fig. 9 is a cross section on the line 9—9 in Fig. 8.

The attachments embodying my improvements may be used in connection with an ordinary platform scale, and this connection has been shown in the drawings, in which 10 represents the platform scale which may be of any approved kind, 11 being the base of the scale, 12 the hollow upright secured to one end of the base, 13 the scale platform, and 14 the rod which supports the platform and which extends longitudinally beneath the same.

As shown, the rod 14 has at its free end knife edge side lugs 15 which extend into perforations in the lower end of a fork 16 formed on the scale rod 17, which rod extends upward through the upright 12 and through the platform lever of the computing attachments, the rod terminating at its upper end in diverging curved arms 18 adapted to support a scoop 19. Above the upper end of the upright 12 the rod 17, is provided with laterally-extending knife-edge side lugs 20 which enter perforations in the depending lugs or ears 21, which extend downward from the lever frame 22, this lever being fulcrumed above the upright 12 and having at its rear side and near opposite ends knife-edge bearings 23 which rest in sockets 24 on the platform 25 which is fixed to the top of the upright 12 and is arranged parallel with the lower platform 13. The lever frame 22 is balanced by the weights 22ª at its rear end. It will thus be seen that whenever anything is placed in the scoop it will depress the lever frame 22 and whenever anything is placed upon the movable platform 13, it will, by means of the rods 14 and 17, likewise depress the lever frame 22 so that the scale may be used as an ordinary scoop or counter scale or as a platform scale, as described below.

On the front edge of the platform 25 is a goose neck 26 which has perforations in opposite sides, as shown at 27, and knife-edge lugs 28 rest in these perforations, the lugs being formed on opposite sides of a socket 29 which forms the socket of a ball bearing, and the lugs 28 serve as a fulcrum for the price beam 30 which beam is thickened as shown at 31 at which point it is secured to the socket 29.

Within the socket 29 is the head 33 of a suspending bolt 34 which extends downward through the price beam 30, as shown in Fig. 9 and between the head of the bolt and the bottom of the socket 29 are balls 32, and a ball bearing is thus formed which permits the easy movement of the price beam. The price beam is thus fulcrumed at right angles to the weighing lever 30.

The above construction enables the price beam to move very easily and freely in a vertical direction, and also to have a certain horizontal movement, so that it cannot bind.

The free end portion of the price beam is graduated so as to express cents and fractions thereof, and as shown in the drawings, the highest amount on the beam is fifty cents, but it will be understood that greater amounts may be expressed. The free end of the price beam terminates in a hook 30ª to which is secured the weight rod 33ª which has at its lower end a plate 34ª adapted to support the weights in the usual way. The opposite end 35 of the price beam 30 is left substantially plain and extends beneath the free edge of the lever frame 22. This portion of the price beam is provided with a mark of United States money, or a similar mark, which indicates that it is a price beam and near the outer end of the plain portion 35 is a counterbalance 36. The part 35 of the price beam extends beneath and substantially parallel with a price per pound beam 37 on which prices indicative of cents and fractions thereof are produced, the beam being graduated so as to read from right to left, while the price beam reads from left to right. The price per pound beam 37 is firmly secured to the free end of the lever frame 22.

The price per pound beam has at one end a stop 38 which limits in one direction the movement of the movable bearing 39. This movable bearing 39 which is shown in detail in Figs. 5 and 6, has a frame 40 held to move over the face of the price per pound beam, and the frame has a curved lower portion 41 comprising parallel curved bars which are held above the plain portion 35 of the price beam 30. In the center of this curved portion is a grooved roller 42 which bears upon the upper edge of the price beam and at the front and rear corners of the frame 40, and on the under side thereof are grooved rollers 43 which bear upon the under side of the price per pound beam 37. At the upper end of the frame 40 is a grooved roller 44 which runs on the upper edge of the beam 37.

The frame 40 is provided with a forwardly-extending handle 45 to facilitate its easy handling, and near the center of the frame and directly above the roller 42 is an indicator 46, which points out the price per pound on the beam 37. On the plain portion 35 of the price beam 30 is an arrow 47 or some other similar mark, which indicates that when the movable bearing 39 is placed directly over this point, the scale will be in position for weighing in the ordinary manner, but when moved off of this point, the scale will indicate the price, amount, &c. of goods weighed.

It will be seen that the price beam has a movement on its fulcrum entirely independent of the movement of the lever frame 22 but when the price beam tilts on its fulcrum the movement will be imparted to the lever 22 by reason of the movable bearing 39 which connects the price beam and the lever. The price beam 30 is connected by straps 48 with the weighing beam 49 which extends beneath and parallel with the price beam and which is graduated in the usual way to express pounds and ounces. As shown in the drawings the weighing beam expresses amounts in weights up to three pounds but it may be made to express greater or less amounts if desired.

The beams 30 and 49 are provided with the usual sliding counter poises 50 and 51, and the beam 49 is marked lbs., or with a similar mark, to indicate that it is a weight beam.

To use the scales for weighing purposes only, that is to ascertain the weight of an article, the movable bearing 39 is adjusted so that the indicator 46 will be directly above the mark 47, the counter-poise 50 on the price beam 30 is placed at 0, the article to be weighed is placed on the platform 13 or within the scoop 19, and the poise 51 is moved on the weight beam 49 until the weight of the article is balanced, the extra weights on the plate 34ª being used if necessary in the ordinary way.

To ascertain the value of an article it is placed in the scoop 19 or upon the platform 12, the poise 51 is placed at 0 on the weight beam 49, the movable bearing 39 is moved until the indicator 46 comes above the price per pound of the article, and the poise 50 is moved outward on the beam 30 until the scales balance and the poise will indicate on the beam the value of the article.

In the drawings, the upper or price beam 30 runs up to fifty cents in amount, and the weight beam to three pounds. In a scale of this kind then, the extra weights used on the plate 34ª would represent three pounds, six pounds, and multiples of three pounds in weight, and each three pounds in weight would correspond to the weight of the scale in price; that is for every three pounds of weight added to the plate 34ª, fifty cents would necessarily be added to the price indicated on the price beam 30. For instance, if the poise 50 was too light to balance the scales and a three-pound or 50-cent weight should be placed upon the plate 34ª and then the poise 50 should come to a balance at the 40 cent mark, the value of the article would be fifty cents, the amount of the weight, plus forty cents, the amount indicated on the beam 30, or a total of ninety cents.

If the amount of an article to be given for a certain price is to be found, the action above described is reversed, that is to say, the movable bearing 39 is adjusted to indicate the price per pound of the article, the poise 50 is placed at the mark which indicates the total price and the article to be delivered is then placed upon the platform 13 or in the scoop 19 and made to balance the scales. In practice I use a fastening device to prevent the accidental slipping of the bearing 39. The fastening device is shown in Figs. 5 and 6. The price per pound beam 37 is provided with holes 52 which are adapted to receive the inner end of a spring-pressed slide bolt 53, mounted beneath the handle 45 of the movable bearing 39, and the slide bolt has its outer end bent to form a handle 54. This construction enables the bolt to be easily adjusted in the holes so as to hold the bearing in any desired position.

Having thus fully described my invention, I claim as new and desire to secure by Letters Patent,—

1. A computing scale comprising a tilting lever frame adapted to support the weight of the load, parallel connected scale beams fulcrumed near the free edge of the lever and made to indicate price and weight, and an adjustable connection between one of the beams and the tilting lever frame, substantially as described.

2. A computing scale comprising a tilting lever frame adapted to carry the load, a price per pound beam fixed to the free edge of the lever frame, parallel beams indicating price and weight, fulcrumed adjacent to the free edge of the lever, and an adjustable bearing connecting one of the parallel beams and the price per pound beam, substantially as described.

3. A computing scale, comprising a vertically movable rod having connection with the scoop and with the weighing platform, a tilting lever frame connected with the vertical rod, said platform lever having a price per pound beam at its free edge, independent parallel beams arranged to indicate price and weight, said beams being fulcrumed near the free edge of the lever frame, and an adjustable bearing connecting one of the parallel beams with the lever frame, substantially as described.

4. A computing scale comprising a fixed support, a tilting lever frame fulcrumed on the support and adapted to carry a load, said lever frame having a price per pound beam at its free edge, a price beam fulcrumed on the support and having one end extending beneath the price per pound beam, an adjustable sliding bearing connecting the price beam and the price per pound beam, and a weight beam extending beneath and parallel with the price beam, substantially as described.

5. The combination with the lever frame and the price per pound beam thereon, of the tilting price beam fulcrumed adjacent to the lever, and the sliding bearing comprising a frame carrying grooved rollers adapted to run on the two beams, and an indicator adapted to move over the price per pound beam, substantially as described.

6. The combination with the support having a goose neck at its front edge, of the socket plate having side lugs fulcrumed in the goose neck, and the price beam connected by a ball joint with the socket plate, substantially as described.

JOHN HENRY SWIHART.

Witnesses:
ANDREW A. MAYSELLES,
WM. D. MCKENNY.